Feb. 8, 1927. 1,616,636
J. W. PROSSER
PROCESS AND APPARATUS FOR PRODUCING DEPTH EFFECT IN PHOTOGRAPHY
Original Filed Dec. 1, 1923
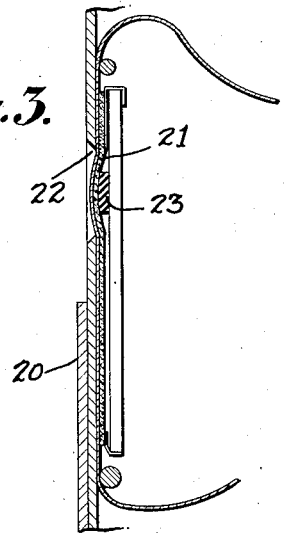
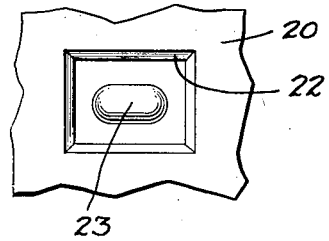
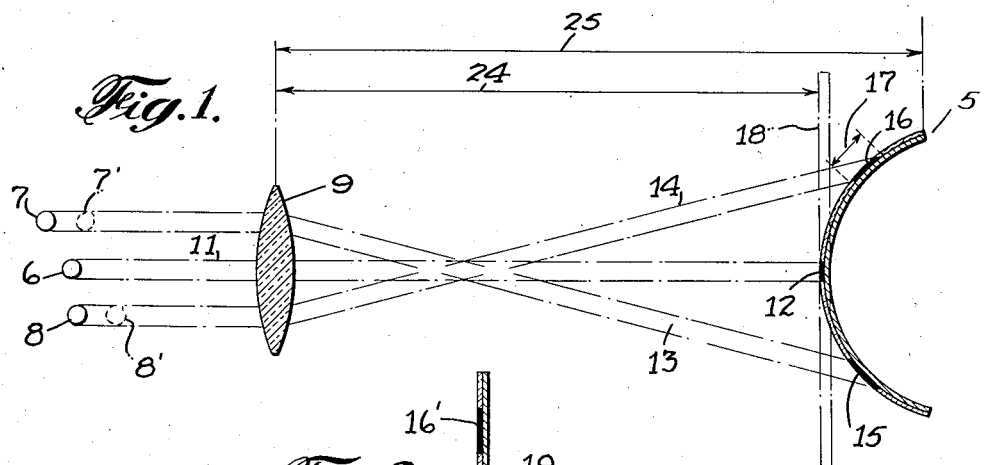
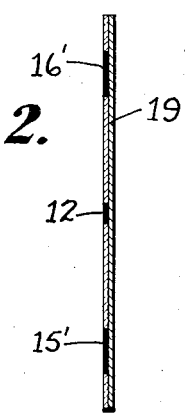
Inventor
JOSEPH W. PROSSER
By his Attorney

Patented Feb. 8, 1927.

1,616,636

UNITED STATES PATENT OFFICE.

JOSEPH W. PROSSER, OF NEW YORK, N. Y.

PROCESS AND APPARATUS FOR PRODUCING DEPTH EFFECT IN PHOTOGRAPHY.

Application filed December 1, 1923, Serial No. 677,951. Renewed July 2, 1926.

Some of the objects of this invention are to reproduce in either "still" or "moving pictures" the effects of depth or perspective; and, in the case of the projection of pictures, to produce an effect of softened lines which without loss of detail will be pleasing to the eye and free of eye-straining influences.

A further important object of the invention is to secure the desired results simply and effectively and by inexpensive means applicable to apparatus in use at the present time.

In the accompanying drawing forming part of this specification there is illustrated an embodiment and method of practising the invention, but as this illustration is primarily for purposes of disclosure, it will be understood that modifications of the same may be resorted to without departure from the broad spirit and scope of the invention as hereinafter defined and claimed.

Figure 1 is a diagrammatic plan view illustrating the action of the camera in taking the picture, with the sensitized medium on which the impression is made appearing in section.

Figure 2 is a sectional view of the print or positive taken from the negative.

Figure 3 is a vertical sectional view of the gate structure of a motion picture camera as equipped for securing the effects of this invention.

Figure 4 is a front view of the same as it appears with the film supporting pad removed.

The first step in the invention consists in supporting the sensitized medium 5, which for convenience may be referred to herein as the "film" within the camera and while under exposure, in an outwardly or forwardly bowed condition, as shown at the right in Figure 1.

To illustrate the effect of this, three objects 6, 7 and 8 are indicated at the left in this diagrammatic view, which objects might, for instance, be considered as the trunks of three trees, one disposed in the center of the field of exposure and the others at the side, one forward of and the other in rear of the central object. The lens 9 of the camera may be of any usual or special form suited to transferring the image to the surface of the film. The light beam 11 defining the central object produces an image 12 at the center of the film showing this object as of substantially normal size. The light beams 13, 14 which define the side objects 7 and 8 are so inclined as to meet the curved side portions of the film at more or less of a tangent, the degree of approach to the tangential being dependent upon the curvature of the film and the angle of the rays. These dimensional rays are thus in effect spread out over the film a distance greater than their actual width, producing on the curved surface of the film, images 15, 16, magnified or enlarged as compared to the image 12 of the central object.

The sensitized layer 17 is of appreciable thickness and as the light rays enter and pass through this layer obliquely, it will be seen that the total impression produced by an object will be equal to the distance between where the rays enter the face of the coating at an obtuse angle and leave at the opposite side at an acute angle, that is the space represented at 17.

This means that when the film is flattened out, as indicated at 18 in Figure 1, or when a flat positive print is taken from the negative as at 19 in Figure 2, the images 15′, 16′ of the side objects will, because of their accentuation, stand out in apparent relief, producing an illusion of perspective. This increase in size when viewed in the final picture has the effect of bringing the side objects forwardly so that the object 7 may appear as though it stood at 7′ and the object 8 as though it were disposed at 8′.

The results described may be effected in a practical and simple way by using a flexible film such as employed for motion pictures and by bulging the same into convex form in the gate structure of the camera.

In Figures 3 and 4 this gate structure is indicated generally at 20 and the means for imparting the curvature to the film is shown as a pad 21 of felt or the like supported within the exposure aperature 22 over a bolster 23 of rubber or the like, occupying the middle portion of the exposure space and formed as a mound rounded in all directions so as to impart a desired curvature to the pad. The felt pad is non-reflecting in its nature so as to form no reflections on the overlaying curved section of film and at the same time forms a support over which the film will curve and return to flat shape readily as it is fed forward by the advancing mechanism.

In Figure 4 the bolster is indicated as of generally elliptical form having major and minor axes corresponding proportionately to the major and minor axes of the oblong window or aperture of the gate structure.

The operation of the invention should be clear from the foregoing, but it might be helpful to a more complete understanding of the invention to consider the fact that it is the relative sizes of objects in binocular vision, employing the principle of triangulation which is the basis of judgment of distance or perspectivity. Hence when a portion of a picture is enlarged as by the photographing on the curved film, an illusion of greater or less relative distance is created and a sense of apparent depth or solidity is given. The curvature is made gradual enough so that there is no perceptible or objectionable distortion. It will be evident that when the film is curved to the rear at the top and bottom, as well as toward the sides, the objects at the top and bottom of the picture will also be accentuated but this degree of accentuation can be reduced or varied by changing the degree or extent of curvature.

Another result of the oblique exposure of the negative to the light rays and the subsequent printing from such an oblique exposure is the softening of the lines of distinction which produces a very pleasing artistic effect and relieves the eyes of strain or fatigue.

Another fact resulting from the photographing on the curved film is that there are two main focal distances, one, 24, between the lens and the foremost section of the curved film, and a second, 25, between the lens and the rearmost part of the film. The effect of this is that in focusing the furthest central objects, closer objects at the sides of the picture will also automatically be brought into perfect definition. The invention thus enables the taking of "infinite" and "close-ups" in proper definition in the same picture.

What I claim is:

1. The process of producing depth effect in pictures which comprises photographing the object which is to be pictured all at once on the full expanse of a convexly curved sensitized medium and then reproducing pictorially from said medium while the same is spread out in a flattened condition.

2. The process of producing depth effect in pictures which comprises photographically exposing a sensitized medium with the full expanse of the same exposed convexly curved toward the object, taking a print of the same while in a flattened condition and then projecting from the print while in a flattened condition.

3. A camera having a film-holding gate for supporting the full width of the film across the entire field of exposure and means for imparting a convex curvature to the full width section of film held by the gate.

4. In photography, a camera having a film-holding gate, means for imparting a curvature to the section of film held by the gate and comprising a bolster and a pad overlying said bolster.

5. In photography, a camera having a film-holding gate, means for imparting a curvature to the section of film held by the gate and comprising a bolster and a pad overlying said bolster, said bolster being of a yielding nature and the pad having non-reflecting resilient characteristics.

6. A motion picture camera having a film-holding gate provided with means for imparting a forward bulge to the central portion of the film held in the field of exposure.

7. A motion picture camera having a film-holding gate with a stationary forwardly curved convex film-supporting pad at the back of the gate opening.

8. A camera having a holder for supporting the full width of a sensitized film in the field of exposure and provided with a stationary curved non-reflecting pad for imparting a forward convex curvature to the full width of the film supported in said holder.

9. In depth effect photography, a camera having means for supporting the full width of the sensitized medium in the field of exposure in a forwardly convexly curved condition and a lens fixed to transfer the full image of the object at once onto the entire area of exposure of the curved sensitized medium.

In witness whereof, I have hereunto set my hand this 26th day of November, 1923.

JOSEPH W. PROSSER.